United States Patent

[11] 3,582,971

| [72] | Inventor | Rudolph A. Coccia<br>North Versailles, Pa. |
|---|---|---|
| [21] | Appl. No. | 872,331 |
| [22] | Filed | Oct. 29, 1969 |
| [45] | Patented | June 1, 1971 |
| [73] | Assignee | Westinghouse Air Brake Company<br>Wilmerding, Pa. |

[54] PROPULSION AND BRAKING CONTROL SYSTEM FOR RAILWAY VEHICLES
11 Claims, 2 Drawing Figs.

[52] U.S. Cl.................................................. 307/9,
246/182, 180/109
[51] Int. Cl.................................................. H02g 3/00
[50] Field of Search........................................ 180/109,
105; 246/182; 192/.03, 32; 307/9, 10

[56] References Cited
UNITED STATES PATENTS
| 2,721,258 | 10/1955 | Freehafer.................... | 246/182 |
| 3,287,555 | 11/1966 | Livingston et al. ........... | 246/182X |

Primary Examiner—Robert K. Schaefer
Assistant Examiner—H. J. Hohauser
Attorney—Ralph W. McIntire, Jr.

ABSTRACT: A rapid transit propulsion and braking control system utilizing a novel master controller including a differential transducer and novel circuitry arrangement for supplying an analog voltage to energize a P-wire circuit to maintain a desired vehicle speed either under a manual mode of operation or an automatic speed control mode of operation, wherein the novel circuitry provides rate control adjustments and speed taper control means for controlling the signal in the P-wire.

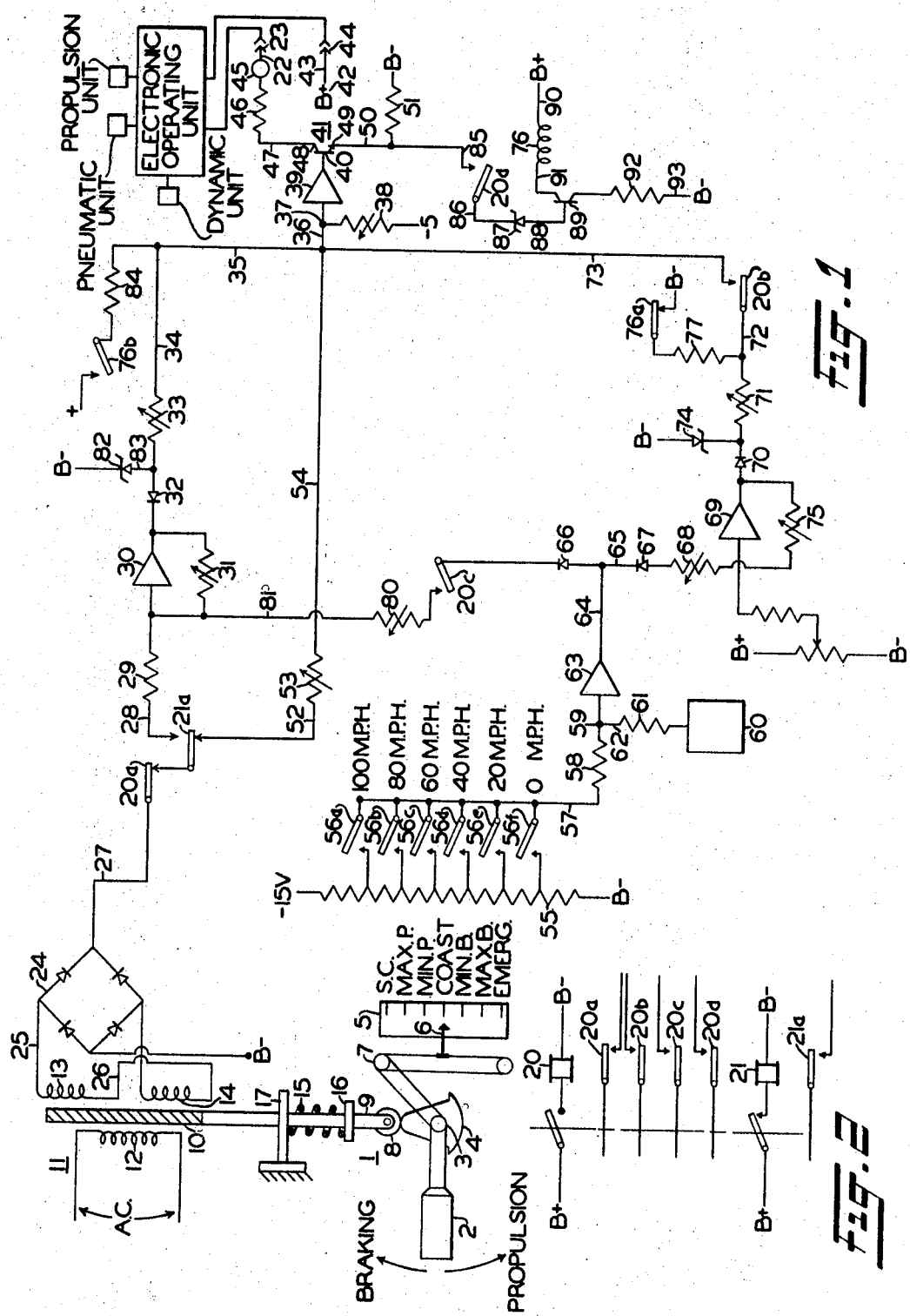

PROPULSION AND BRAKING CONTROL SYSTEM FOR RAILWAY VEHICLES

BACKGROUND OF INVENTION

In modern rapid transit apparatus, the braking and propulsion controls are effected by either a manual-operated master control mode or a separate automatic wayside or pushbutton arrangement thereby requiring two separate systems. It has been desirous to have a single novel master controller and circuitry arrangement to control the braking and propulsion in either of the two modes, manual or automatic, to maintain a desired vehicle speed with circuitry means for automatically modulating the P-wire signal in the automatic mode.

SUMMARY OF INVENTION

According to the present invention, there is provided a propulsion and braking control apparatus utilizing a novel master controller arrangement including transducer means for selectively utilizing either a manual or automatic mode of speed control to maintain a desired speed of a vehicle. The manual mode is effective responsively to movement of the master controller handle from a neutral or coast position in opposite directions to either a braking zone or propulsion zones to control selective energization of a P-wire control signal throughout the train. The automatic mode is effective when the master controller handle is moved to a "speed control" position in the propulsion zone in which position, various branches of speed selector circuit (comprising a voltage divider network and a selected one of a series of contacts) establishes a desired speed circuitry. The voltage established in the desired speed circuitry as from pushbuttons or wayside signals is compared with a voltage representative of actual train speed (as derived from speed generators) to provide a resultant error signal which in turn effects a selective control of energization of the P-wire control signal throughout the train, said error signal being modulated by rate control adjustments and speed taper control means at low error levels to prevent cycling action. The analog voltage level of the energization of the P-wire controls the functioning of an electronic operating unit to control the braking or propulsion in either the manual or automatic mode of operation to regulate the vehicle speed.

In the accompanying drawing:

FIG. 1 is a schematic diagram of the essentials of the master controller and accompanying circuitry for establishing the energization of the P-wire circuitry.

FIG. 2 is a view of the contact member circuitry controlled by cam-operated switches on the master controller operating handle stem.

DESCRIPTION

Referring to FIG. 1 of the drawing, there is shown a master controller device 1 including an operating handle 2, and operating stem 3 having a plurality of cams, only one of which is shown (cam 4), mounted thereon to be rotated with rotation of said stem, an indicator plate 5 having an indicator 6 variably positioned along said plate by a pulley and belt drive system in accordance with the positioning of the operating handle 2. A cam 4 is secured to the operating stem 3 in such a manner to engage an insulated cam follower 8 on an insulated end of a follower rod 9, the other end being formed as an iron core 10 of a linear position differential transducer 11. The differential transducer 11 comprises an alternating current voltage supplied primary winding 12 and a pair of secondary windings 13 and 14 located end to end opposite the primary winding with the iron core 10 positionable in the field between the primary winding 12 and the secondary windings 13 and 14. The secondary windings 13 and 14 are connected in a manner to serially oppose each other such that when the iron core 10 is positioned symmetrically between them the induced voltages in the secondary windings are equal and opposite to result in a zero output signal therefrom. The zero output condition just described is arranged to occur by preadjustment of the cam follower on the cam 4 when the operating handle 2 is in a neutral or "coast" position described hereinafter. A spring 15 encircling the follower rod 9 is interposed between a stop 16 on the rod and a stationary-mounted guide ring 17 in a manner to maintain a spring force acting on the cam follower 8 in rolling engagement with the cam 4 as the operating handle is rotated as explained hereinafter.

The indicating plate 5, the operating handle, and the iron core 10 are all coordinated such that as the operating handle 2 is rotated clockwise, the cam 4 permits the cam follower 8 and follower rod 9 to ride downward and reposition the iron core 10 in the field of the transducer 11 to vary the output signal therefrom while simultaneously the indicator 6 is moved to a respective new position on the indicator plate 5 in accordance with the degree of rotation of the handle to indicate selectively "minimum brake" "maximum brake" with a graduated variable degree of braking indicated between these two positions. An "emergency brake" position is located beyond the "maximum brake" position.

Similarly, as the operating handle 2 is rotated counterclockwise the cam 4 permits the cam follower 8 and follower rod 9 to ride downward to reposition the iron core 10 in the field of the transducer 11 to vary the output signal therefrom while simultaneously the indicator 6 is respectively repositioned on the indicator plate 5 between a "minimum power" and a "maximum power" position in accordance with the degree of rotation of the handle 2 to effect different degrees of propulsion in a manner described hereinafter. A "speed control" position is located beyond the "maximum power" position to provide for an automatic speed control as described hereinafter.

Associated with the operating stem 3 is a plurality of cam switches (not shown) the contact members of which are shown as 18 and 19 of FIG. 2 to control energization of control relays 20 and 21 with their respective contact members 20a, 20b, 20c, 20d and 21a to complete selected circuitry as hereinafter described.

The master controller device 1 and accompanying circuitry described hereinafter effect control of the energization of a well-known P-wire control circuit extending throughout the train, one end of which shown herein as wire 22 with coupling switches 23 leading to the usual "Electronic Operating Unit" for controlling the usual "Pneumatic Unit" of brake control, the "Propulsion Unit" and the "Dynamic Braking Unit" in a well-known manner. The P-wire means for controlling brake and propulsion units throughout the train uses variable energization of said wire from 0 amperage to 1 ampere in a well-known manner with 0 amperes calling for maximum brake, and a graduated braking range between 0 and 0.5 amperes, 0.5 amperes calling for coasting with no braking or propulsion, with a graduated propulsion range between 0.5 and 1 amperes with 1 ampere calling for maximum propulsion effect in a manner described under "Operation".

OPERATION

In operation, with the operating handle 2 in the neutral position, as shown, the cam 4 is positioned such that the high contour thereof engages the cam follower 8 to position the follower rod 9 and consequently the iron core 10 at its high point in the field of the transducer 11 such that output of the secondary windings 13 and 14 is equal and opposite resulting in a zero input to a rectifier bridge network 24. While in this neutral position, the operating handle (through the pulley and belt system 7) has also positioned the indicator 6 in a "coast" position on the indicator plate 5 to identify this zero output from the transducer 11 as a coast condition with no braking or propulsion effort being attempted. Due to the graduated low contour positions on the cam 4, movement of the operating handle in either direction results in displacement of the iron core 10 in only one direction within the field of the transducer 11, however operation of cam-operated switch contact members 18 and 19 (FIG. 2) is effected by movement in the different direction to result in different circuitry as now explained.

MANUAL MODE-CAM SWITCH OPERATION

In a manual mode of operation with the operating handle 2 in the "coast" position both the cam switches (not shown) on the operating stem 3 are in their normal open position with the respective contact members 18 and 19 open (as shown in FIG. 2) thereby maintaining both the control relays 20 and 21 deenergized. When the handle 2 is moved into the "minimum power" zone, the cam switch on stem 3 controlling the contact member 19 closes to effect completion of circuitry shown in part in FIG. 2 from a B+ power source via said contact member 19 and relay 21 to B— to thereby energize and pickup the relay 21 and move the contact member 21a thereof (shown in both FIG. 1 and FIG. 2) from its lower closed position to its upper closed position to complete propulsion control circuitry as shown in FIG. 1 and described hereinafter. The contact member 19 remains closed by cam operation in the propulsion zone of the operating handle. The contact member 18 is closed by cam operation when the operating handle 2 is moved to "speed control" position to thereby complete circuitry from a B+ power source via said contact member 18 and relay 20 to B— to thereby energize and pickup the relay 20 and move the contact members 20a through 20d thereof (shown in both FIG. 1 and FIG. 2) to their respective closed or open positions as described hereinafter. In the braking zone of the operating handle 2 both cam-operated switch contact members 18 and 19 are maintained opened.

In view of the above description of the positioning of the operating handle 2 and associated cam switches the operation of the equipment is as follows:

MANUAL MODE-PROPULSION

In the manual mode when the operating handle 2 is moved to "minimum power" position, the cam-operated contact member 18 is open and the cam-operated contact member 19 is closed. The cam follower 8 moved downward along the lower contour of the cam 4 thereby causing a corresponding downward displacement of the iron core 10 in the field of the transducer 11. The downward displacement interrupts the balance of the two induced voltages in the secondary windings 13 and 14 to effect a resultant differential signal of positive polarity across the output wires 25 and 26 to the rectifier bridge network 24, of a magnitude between 0 and +5 volts proportional to the displacement of the core 10 which in turn is proportional to the selected movement of the operating handle 2 of the master controller. With cam-operated contact member 18 open, the contact member 20a of the deenergized relay 20 is in its closed position; and with cam-operated contact member 19 closed, the contact member 21a of the energized relay 21 is in its upper closed position such that the output signal of the bridge 24 is supplied via wire 27, closed contact member 20a of deenergized relay 20, upper closed contact member 21a of energized relay 20, wire 28, a series connected trimming resistor 29 and an operational amplifier 30. A variable resistor 31 connected in parallel with amplifier 30 cooperatively acts with resistor 29 by preadjustment to regulate the gain of the amplifier 30 to a gain of one such that the output signal therefrom is equal to the input signal with an inverted polarity, thus, the positive signal supplied thereto is merely made negative between 0 and 0.5 volts and of the same magnitude. The negative signal output from amplifier 30 is then fed through the blocking diode 32 and a trimming potentiometer 33 to wires 34, 35 and 36 to a summing point 37 where a —5-volt negative bias is supplied thereto via a B— source and trimming potentiometer 38. The voltage at point 37 is thus the algebraic sum of the negative signal output from amplifier 30 between 0 and —5 volts and the —5-volt negative bias, therefore being in a range from —5 to —10 volts. An operational amplifier 39 having a gain of 1 inverts this negative signal to a +5- to +10-volt signal input to the base terminal 40 of a transistor 41 arranged in an emitter-follower configuration, to permit the transistor to operate according to the magnitude of said signal to vary the analog current level in the P-wire loop including the electronic operating unit, proportionately between 0.5 and 1.0 amperes in the usual manner to provide a desired propulsion control. The P-wire loop as shown in FIG. 1 includes a B+ source 42, wire 43, and connector 44 which is connected to a train wire (not shown) throughout the train to the electronic operating units and back to connector 23, wire 22, and ammeter 45 indicating the P-wire current level, a trimming resistor 46, wire 47 to the collector terminal 48, and emitter terminal 49 of transistor 41, wire 50 and limiting resistor 51 to B—. It is thus the regulation of the current level in this P-wire loop between 0.5 and 1.0 amperes that correspondingly regulates operation of the propulsion portion of the electronic operating unit to control the degree of propulsion of the vehicle according to the positioning of operating handle 2 of the master controller.

MANUAL MODE-BRAKING

In the manual mode, when the operating handle 2 is moved into the braking zone, both the cam-operated contact members opened in "coast" remain open as the handle is rotated into the braking zone. The cam follower 8 moving along the lower contour of the cam 4 causes downward displacement of the iron core 10 in the field of the transducer 11 to interrupt the balance of the induced voltages in the secondary windings 13 and 14 and effect a resultant differential signal output therefrom. This output signal from the transducer 11 is of positive polarity and of a magnitude proportional to the displacement of iron core 10 which in turn is proportional to the degree of movement of the operating handle 2 into the "braking zone" of the master controller. With cam-operated contact members 18 and 19 both open, the output signal of the transducer between 0 and +5 volts is directed from the rectifier bridge network 24 to wire 27, closed contact member 20a of deenergized relay 20, contact member 21a of deenergized relay 21 in its down closed position, wire 52, trimming resistor 53, wire 54 and wire 36 to the summing point 37. A —5-volt negative bias is supplied to the 0 to +5-volt signal and the algebraic sum of the compared signals now of negative voltage is fed to the operational amplifier 39 having a gain of 1 such that the input signal is merely inverted in polarity and the resultant positive signal of from 0 to +5 volts is supplied to the base terminal 40 of the transistor 41 arranged in an emitter-follower configuration to permit the transistor to vary the analog current level in the P-wire loop proportionately between 0 and 0.5 ampere, in the usual manner to operate the braking portion of the electronic operating unit to provide a desired braking control. It is thus the regulation of the current level in this P-wire loop between 0 and 0.5 amperes that correspondingly regulates the degree of braking of the vehicle according to the position of the operating handle 2 of the master controller.

Any necessary alignment of the control signals in the circuitry can be done by adjustment of the resistors 33, and 53 to control the signal to the summing point 37 such that P-wire current level conforms to the 0—0.5 ampere braking zone and 0.5 to 1 ampere propulsion zone when the operating handle 2 is in the appropriate zones and adjustment of resistor 31 maintains a zero amperage in the P-wire while the operating handle 2 is in the "coast " position.

The aforedescribed manual control mode of manipulation of the operating handle of the master controller to control the P-wire current level to control both braking and propulsion is effective where frequent stopping and change of propulsion is necessary; however on long runs having infrequent stops, such means of control is inconvenient and an automatic speed control is desirable. Such automatic speed control can be provided with the present apparatus as described herein.

AUTOMATIC SPEED CONTROL

With movement of the operating handle 2 into the "speed control" position, a cam operates to close the contact member 18 to effect energization and pickup of relay 20 to position the contact members thereof as described hereinafter. The contact member 20a is opened to interrupt any signal output from the transducer 11, thereby nullifying the manual mode of braking or propulsion controls previously described. Associated with the master control console is means such as wayside signals or as assumed herein, a bank of pushbuttons (not shown) for selectively controlling a speed selector circuit shown herein as a voltage divider network. The divider network includes a source of negative voltage supplied to a resistance bank 55 with a plurality of taps selectively connected by pushbuttons (not shown) to one of a plurality of contact members 56a, 56b, 56c, 56d, 56e, 56f to supply various graduated degrees of a negative voltage signal (corresponding to various desired speeds) via a wire 57 and trimming resistor 58 to a summing point 59. This negative signal at the summing point 59 is compared with a positive signal, the magnitude of which corresponds to the actual vehicle speed as provided by a tachometer generator 60 via a trimming resistor 61 and wire 62 to the summing point 59 resulting in summation error signal output. It should be noted herein that if so desired, automatic wayside or radio signals could be substituted for the aforementioned assumed operator-selected pushbutton control to provide the negative signal to the summing point 59.

The resultant error signal at the summing point 59 is now utilized as an input signal to an operational amplifier 63 where the polarity is reversed and the output therefrom is supplied by either one of the other of two selected circuits (described hereinafter) dependent on the polarity of said signal which in turn is dependent on whether the actual train speed and the corresponding positive polarity signal derived from the tachometer generator 60 is exceeding or is less than the desired train speed and the corresponding negative signal as derived from the voltage divider network.

It should be noted that closure of each of the contact members 56a, 56b, 56c, 56d, 56e and 56f, as indicated in FIG. 1, results in a negative signal voltage representative of speeds 100, 80, 60, 40, 20 and 0 m.p.h. respectively.

As an example of automatic braking control while in the "-speed control" mode, assume the contact member 56c has been closed (by pushbutton or other signal means), the voltage divider network operates to supply a specific negative voltage preselected to represent a specific corresponding vehicle speed (in this instance a 60-m.p.h. speed) that is desired. This signal is hereinafter referred to as the desired speed signal. If the actual train speed is above 60 m.p.h. at for example 63 m.p.h., the representative positive signal (actual speed signal) supplied by the tachometer generator 60 to the summing point 59 is greater in magnitude than the desired speed signal, resulting in a summation positive error signal input to the operational amplifier 63. With the positive error signal input to amplifier 63, a negative output signal results in wires 64 and 65, said negative signal being blocked by a diode 66 and passed by diode 67 to an adjusting resistor 68 and the input of an operational amplifier 69 where the signal is again inverted to a positive signal and supplied via a diode 70, trimming resistor 71, wire 72, closed contact member 20b of energized relay 20, wire 73 to wire 36 and the summing point 37 for comparison with the −5-volts bias signal at such point. The result is a summation negative error signal which is again inverted by operational amplifier 39 and supplied as a positive signal to the base terminal 40 of transistor 41 to vary the P-wire current level for controlling the electronic operating unit to effect braking controls in the usual manner to attempt to reduce the actual speed to the desired speed resulting in a continuous speed control. For detailed explanation purposes of the above-described automatic braking circuit it is assumed that operational amplifier 63 has a gain of 10 and operational amplifier 69 has a gain of 5. It is also assumed that the voltage at the summing point 59 has been adjusted such that a 1 m.p.h. deviation between the actual speed and the desired speed called for by the contacts 56a—56f will result in a 0.1 volt error input signal to operational amplifier 63. Thus, with the cumulative gain of the amplifiers 63 and 69, it can be seen that any time the speed deviation exceeds the 1 m.p.h. or 0.1-volt signal, the output signal from amplifier 69 will be greater than the desired +5-volt limit to be delivered to the summing point 37. To limit this signal to a working voltage, a Zener diode 74 is provided at the output of amplifier 69 to control the maximum positive voltage level and maintain the output signal within a 0 to +5 -volt range, thus the positive voltage signal supplied to the summing points 37 cannot exceed the −5-volt bias voltage thereby insuring that the output signal of amplifier 39 under these conditions is limited between 0 and +5 volts to control the analog current level of the P-wire within the braking range of 0 to 0.5 amperes in an attempt to bring the actual speed in correspondence with the desired speed. With the occurrence of the braking efforts effected by this P-wire control, the biasing signal from the tachometer generator 60 at summing point 59 is continuously varied to modulate the error signal input to amplifier 63 as the deviation between actual speed and desired speed decreases to maintain a decreasing brake control. To maintain this braking control at a smooth rate when approaching the desired speed, the adjusting resistor 68 is preset along with adjusting resistor 75 in parallel with amplifier 69 to regulate both the gain of amplifier 69, and the controlling effect of the Zener diode 74 as the actual speed approaches the desired speed and thereby obtain a smooth tapering transition from braking to coasting to graduate the retarding rate of the vehicle. Due to this adjustment, it can be seen that in this tapering zone of braking transition the P-wire current level will be stabilized at a point where further decreasing of braking force would result in an input signal voltage to amplifier 39 which would tend to result a P-wire current level which may call for propulsion and an increase of speed in which the error signal approaches but would not actually stop at a zero value. To adjust for this transition, a preadjusted selective means of establishing a braking rate below the maximum rate in the automatic speed control mode of operation is provided by a separate biasing circuit having a small negative voltage of approximately −1, −2 or −3 volts to reduce and regulate the output signal of amplifier 69 to result in adjustment of the P-wire control current level to in turn establish and maintain the maximum braking rate at which the vehicle speed can be regulated by braking control conform to desired speed. This additional limiting biasing circuit is established from a small negative voltage source via a normally closed contact member 76a of a P-wire controlled relay 76 (explained hereinafter) and a trimming resistor 77 to wire 72 in parallel with the controlling effect of the Zener diode 74.

A deadband voltage range in which the input signal to amplifier 69 is rendered ineffective to trigger said amplifier is also preadjusted by a potentiometer 78 and trimming resistor 79 in parallel with said input signal so as to reduce the sensitivity of the speed control circuitry from oscillating between a brake or power control when the deviation between actual speed and desired speed is of a very small degree.

Having now assumed that the error signal to the amplifier 63 is of positive voltage resulting in an automatic braking control, it should now be assumed that the error signal to amplifier 63 is of negative voltage due to the fact that the actual speed signal is smaller than the desired speed signal by reason that the actual vehicle speed is slower than the desired speed thereby calling for propulsion controls. With a negative error signal supplied to amplifier 63 a positive output signal results, said positive signal being blocked by diode 67 and passed by diode 66.

The positive signal from the amplifier is passed via wire 65 and diode 66 to a contact member 20c of relay 20 (energized in speed control mode), trimming resistor 80, and wire 81 to the input of amplifier 30. The amplifier 30 in the previously described manual mode of operation had a gain of 1 due to the cooperation of the resistors 29 and 31, however, in the speed control mode the cooperation of resistors 80 and 31 adjusts the amplifier 30 to have a gain of 5. Adjustment of resistor 80 also controls the smooth transistor from maximum propulsion to coasting by controlling the gain of amplifier 30. The input signal to amplifier 30 is inverted in polarity to a negative signal which is passed by diode 32 and is limited between 0 to −5 volts by the controlling effect of Zener diode 82 to control the maximum negative voltage level in a well-known manner similar to the previously described operation of Zener diode 74 of the braking circuitry. The negative propulsion signal then passes via wire 83, adjustable resistor 33, wire 34, wire 35 to the summing point 39 where the negative bias signal is added thereto as summation input signal to the amplifier 39 where it is again inverted to a positive signal of +5 to +10 volts and applied to the emitter terminal 40 of transistor 41 to control the P-wire current level between 0.5 and 1 ampere and thereby control the electronic operating unit to regulate propulsion of the vehicle in the usual manner in proportion to the error signal at amplifier 63 as previously described. A separate additional limiting biasing circuit having a small positive voltage of approximately 0 to +3 volts to regulate the output signal of amplifier 30 to in turn regulate the P-wire control current level above the 0.5-ampere value and establish a lower limit of propulsion rate control means at which the vehicle speed can be regulated by propulsion control to conform to desired speed without going to a braking control. The circuitry for establishing this additional biasing circuit from the small positive voltage includes a closed contact member 76b of a P-wire controlled relay 76 and a trimming resistor 84 to wire 34 in parallel with the controlling effect of the Zener diode 82. The P-wire controlled relay 76 and its contact members 76a, 76b control the additional limiting biasing circuits for controlling the limits of the braking rate and propulsion rate control of the P-wire as previously described, by use of branch P-wire control circuitry. This branch P-wire control circuitry is in parallel with the P-wire and includes a voltage source, the P-wire to a wire 85, a closed contact member 20d of the relay 20 energized in the speed control mode, wire 86, a preadjusted Zener diode 87, wire 88 to the base terminal of a transistor 89 which is then rendered operative to complete energizing and pickup circuitry to the relay 76 via the B+ source, wire 90, relay 76, wire 91 to the collector and emitter terminals of transistor 89, trimming resistor 92 and wire 93 to B−. The controlling effect of Zener diode 87 is designed to control the energization of the relay 76 such as to complete circuitry thereto when the P-wire current level exceeds 0.55 ampere. When the relay 76 energizes and picks up, the normally closed contact member 76a opens and the normally open contact member 76b closes thereby respectively cutting out the braking rate limiting bias circuitry previously described and cutting in the propulsion rate limiting bias as the P-wire current level shifts from 0 to 0.5 ampere braking zone to the 0.5 to 1 ampere propulsion zone. Energization of relay 76 may also be effective to cause opening or closing of dynamic braking contactors (not shown) in the train line circuitry to complete dynamic braking circuitry (not shown) as desired with different current levels in the P-wire effecting different control of the electronic operating unit.

Having now described the invention, what I claim as new and desire to secure by Letters Patent, is:

1. A braking and propulsion system for a vehicle including in combination:
   a. a master controller means having a manually operated handle means positionable in different operating zones for effecting different braking or operating conditions;
   b. an electronic transducer means controllable by manual operation of the handle means of said master controller means to provide a selectively variable electrical output signal;
   c. a current-carrying control wire for selectively causing a vehicle brake or propulsion control effect in accordance with the current therein being respectively below or above a predetermined level;
   d. a first circuit means effectively energized by a signal output from said transducer means responsive to movement of said handle means of said master controller means to a first zone to energize said control wire to selective values below said predetermined level;
   e. a second circuit means effectively energized by a signal output from said transducer means responsive to movement of said handle means of said master controller means to a second zone to energize said control wire to selective values above said predetermined level;
   f. means for providing a selected electrical signal representative of a desired speed;
   g. means for providing an electrical signal representative of actual speed;
   h. comparison means responsive to deviation between said desired speed signal and actual speed signal for developing an error signal of degree and a polarity in accordance with the magnitude of deviation in one direction or another; and
   i. third circuit means effectively energized by said error signal when said handle of said transducer means is in a third zone to selectively energize said control wire a selected degree above or below said predetermined level in accordance with the polarity of said error signal.

2. The combination according to claim 1, wherein said output signal of said transducer is variable in degree but of nonchanging polarity in accordance with positioning of said operating handle out of a neutral zone in opposite directions to either a braking zone or a propulsion zone a distance proportional to the degree of braking or propulsion effect desired.

3. The combination according to claim 1, wherein said master controller means includes switching means operative responsively to movement of said handle means into said first zone for rendering said first circuit means effective to be energized and said second circuit means deenergized; and operative responsively to movement of said handle means into said second zone for rendering said second circuit means effective to be energized and said first circuit means deenergized.

4. The combination claimed in claim 1, further characterized by including a first auxiliary circuit means including an operational amplifier having a variable adjusted gain to result in diminishing control effect in said control wire as caused by said third circuit means while said error signal is nearing a zero level.

5. The combination according to claim 4, wherein is further provided a second auxiliary circuit means including an adjustable bias voltage source to modulate said error signal in said third circuit means when said deviation of said speed signals are at a low level and prevent the energization of said control wire from cycling above and below said predetermined level.

6. The combination according to claim 5, wherein is further provided a third auxiliary circuit means including a relay means and potentiometer means operatively controlled by a Zener diode in parallel relation with said control wire for rendering said second auxiliary circuit means operative or inoperative in accordance with the current level in said control wire.

7. The combination as claimed in claim 6, further characterized in having dynamic brake controlling means operative responsively to control of said relay means of said third auxiliary circuit means.

8. A braking and propulsion system for a vehicle including in combination:
   a. an electronic operating unit operative responsively to electronic control signals for effecting braking or propulsion controls of the vehicle as desired.
   b. a control wire energizable by a variable electronic control signal therein having a brake control signal of a magnitude ranging from one preselected value to a second preselected value supplied to said electronic operating unit to effect a brake control from maximum braking to minimum braking and energizable by a propulsion control signal therein having a magnitude ranging from said second preselected value to a third preselected value supplied to said electronic operating unit to effect a propulsion control from minimum propulsion to maximum propulsion;

c. master controller means having a variable position operating handle means;

d. transducer means for effecting a variable control signal in said control wire in accordance with manual positioning of said operating handle means; and e. automatic signal means for effecting an automatic variable control signal in said control wire independently of said transducer means and dependent on positioning of said operating handle of the master controller means in a preselected position.

9. The combination claimed in claim 8, further characterized in that said master controller means includes switching means operatively responsive to movement of said operating handle:

(i) into one zone for rendering said variable control signal from said transducer means effective to result in a brake control signal in said control wire;

(ii) into a second zone for rendering said variable control signal from said transducer means effective to result in a propulsion control signal in said control wire; and (iii) in a certain position outside said first zone and outside said second zone for interrupting the control signal from said transducer means and rendering said automatic signal means effective to supply an automatic variable control signal in said control wire.

10. The combination claimed in claim 9, further characterized by including a selector means effective to supply an automatic control signal of selective magnitude to said control wire independently of said transducer means.

11. The combination claimed in claim 10, further characterized by including speed signal generating means operative to supply a speed signal to modify said automatic control signal and maintain the selected magnitude thereof to said control wire.